June 26, 1962 T. A. CRANE ET AL 3,041,157
METHOD FOR MAKING FERTILIZER
Filed Oct. 5, 1955 4 Sheets-Sheet 1
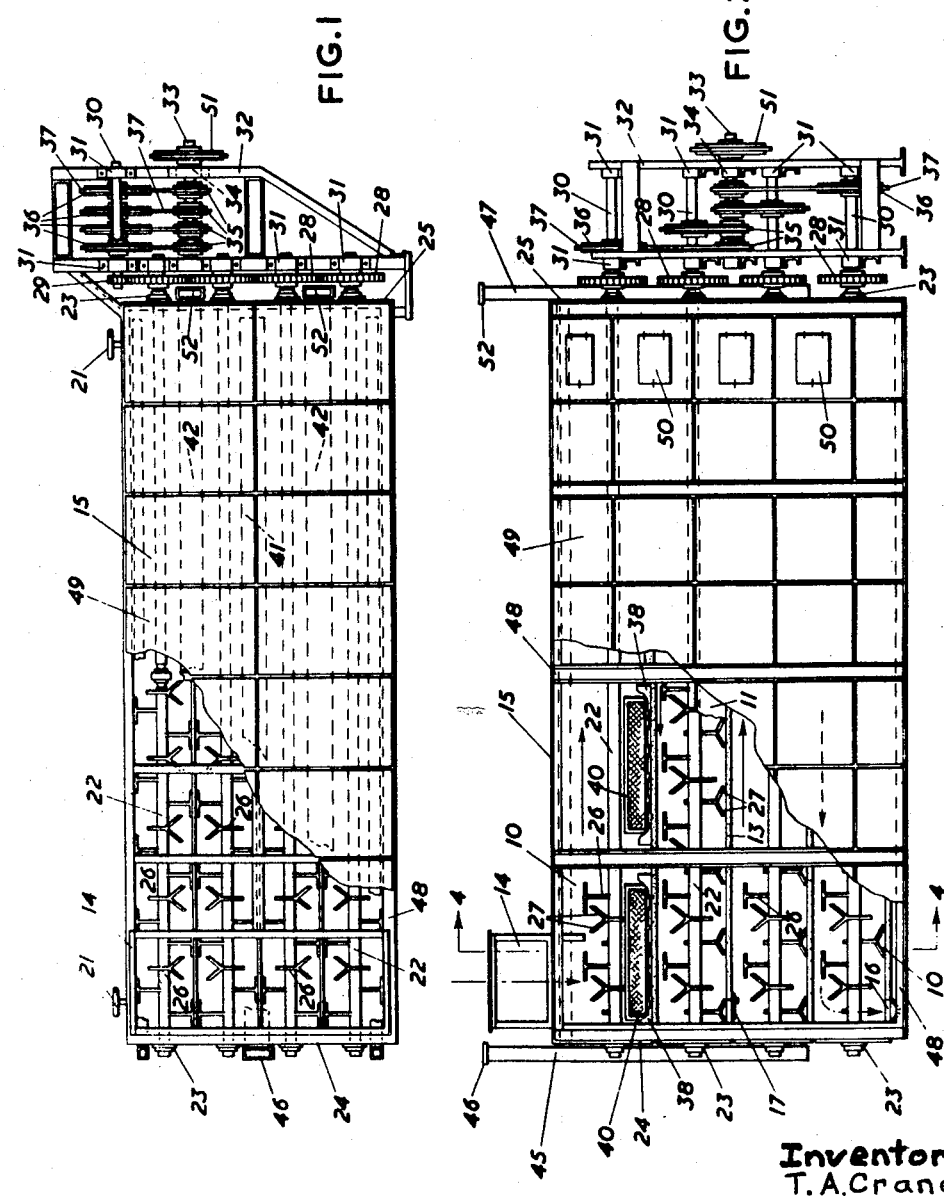
Inventors
T. A. Crane
P. R. Adams
Fetherstonhaugh & Co
Atty's

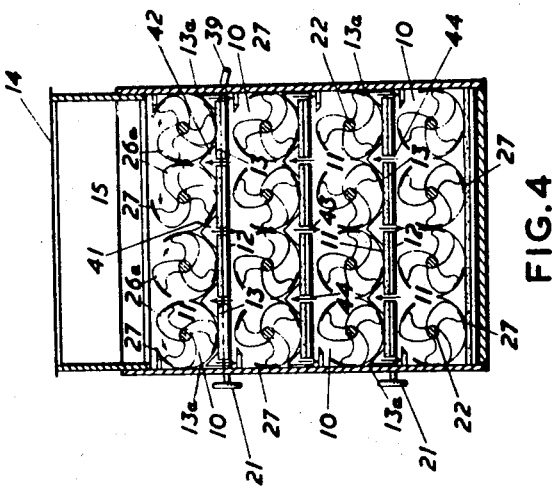
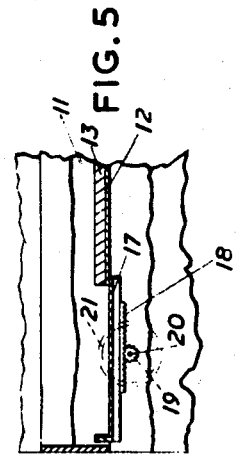
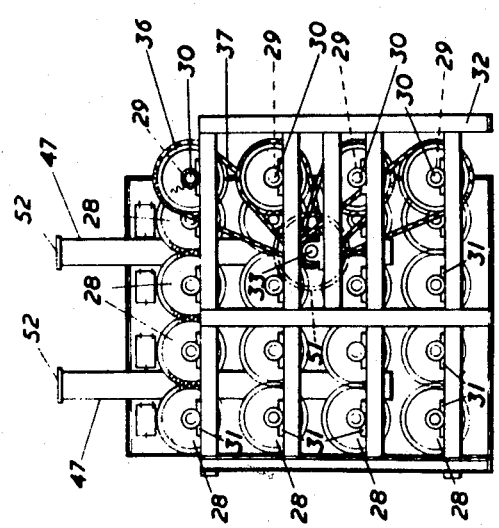
Inventors
T. A. Crane
P. R. Adams
Featherstonhaugh & Co
Atty's Inventors
THOMAS A. CRANE
PERCY R. ADAMS
By- *Featherstonhaugh & Co.*
Att'ys June 26, 1962 T. A. CRANE ET AL 3,041,157
METHOD FOR MAKING FERTILIZER
Filed Oct. 5, 1955 4 Sheets-Sheet 4

Inventors
THOMAS A. CRANE
PERCY R. ADAMS
By~ Featherstonhaugh & Co.
Att'ys

United States Patent Office 3,041,157
Patented June 26, 1962

3,041,157
METHOD FOR MAKING FERTILIZER
Thomas Archibald Crane, 37 Glen Donwynne Road, Toronto, Ontario, Canada, and Percy Richard Adams, 11 Warden Ave., Mimico, Ontario, Canada
Filed Oct. 5, 1955, Ser. No. 538,716
1 Claim. (Cl. 71—9)

This is a continuation-in-part of United States patent application Serial No. 398,334, filed December 15, 1953, now abandoned.

This invention relates to a method and means for converting putrefiable organic waste material into compost by a bacteriological process wherein chambers wherein incubation and fermentation may take place are provided through which the material slowly progresses under means for impelling it. In order to accelerate and assist the bacteriological process during said progress, material which has incubated and fermented to a certain degree is diverted and recirculated with fresher material.

An object of this invention is to devise a simple method for producing balanced organic compost from organic waste such as garbage, industrial waste materials, packing house waste materials, fish plant waste, farm crop waste, sewage sludge, etc., and to also furnish a simple mechanized digester unit into which the waste is fed in its raw state and through which it is mechanically propelled to be finally ejected in compost form.

Before the waste is processed, it is first sorted to remove inorganic matter, and is then put through a grinder to reduce the material to a finely ground form, when it is then agitated to remove the excess moisture. In feeding the ground organic material into the digester unit, inoculating bacteria and other additives may be put into the waste to balance and assist the process.

The structure preferably comprises a digester unit of a plurality of tiers of chambers, each of which contain impulsion means which are preferably rotary blade conveyors. Recirculation may be performed by recirculating from one end of one of the chambers to the other end thereof, or circulating across said chambers, that is, at right angles to the resultant progress of the material therein due to the operation of the rotary blade conveyors. It will be noted that such material progress must be slow since any great agitation will inhibit the multiplication of the bacteria whose numbers it is desired to increase.

The treated waste passes continuously through the digester unit at an imperceptibly slow speed of four to five feet per hour; as the path of travel of the waste material through an average digester unit is approximately one hundred feet long, the waste material is treated for approximately twenty-four hours in its conversion to organic compost.

The purpose of the invention is to convert organic waste material into a useable, healthy compost and is accomplished by mechanically promoting conditions under which may strains of aerobic bacteria will work in their proper sequence. To do this, the unit is so constructed that the material passes through four main stages or chambers, one stage above the other, the first stage being in the top and the last stage being in the bottom. Each stage is definitely insulated and controlled so that its temperature, humidity and air do not affect any of the other stages. The material to be processed is put into the unit at one end of the top of the first stage. While the bacteria are working on the material in the first stage, the material is gently moved along to the end of the first stage, when it is fed into the second stage, wherein the second stage bacteria work on the material as it is being moved along to the end of the second stage, the material being then fed into the beginning of the third stage. The third group of bacteria work on the material as it moves along to the end of that stage, when it is fed into the fourth stage. In the fourth stage the final group of bacteria completes the process, as the material is gradually moved to the discharge end of the unit.

During this progress the material may be recirculated in three ways:

(1) Across the chamber at an angle to its overall resultant path.

(2) Some percentage of the material may be moved in the opposite direction in the chamber to the resultant path of the material through that chamber.

(3) Some percentage of the material may be moved from a lower chamber back to an upper chamber.

A particular object of the invention is to so design the rotary blades that they will gently agitate and aerate the waste material as it passes through the chambers under the action of the blades, fresh air controlled as to volume and temperature being introduced into the chambers as occasion demands.

By providing varying impulsion speeds along a single impulsion means congestion areas of material are provided and at these congestion areas, the material is forced into one of the adjacent impulsion areas. Therefore by adjusting the impulsion means in the chamber, cross circulation in the chamber may be provided.

A further object of the invention is to form the bottoms of the chambers with a plurality of substantially semi-circular troughs in which the rotary blades are centrally mounted, the shafts of the rotary blades carrying fins which scrape across the faces of the troughs as the blades rotate and so prevent any of the material from clinging to the faces of the troughs, and whereby all of the material is in constant gentle agitated movement in its passage from one end of its trough toward the other or from one trough to an adjacent trough.

With the foregoing and other objects in view, as shall appear, our invention consists of a method for producing compost from organic waste, together with an apparatus for carrying out such method, as shall hereinafter be described and is illustrated in the accompanying drawings, in which:

FIGURE 1 is a plan view of the digester unit, part of the upper portion thereof being broken away.

FIGURE 2 is a side elevational view of the unit, part of the side thereof being broken away.

FIGURE 3 is an end elevational view of the unit and showing the drive assembly for the rotary blades.

FIGURE 4 is a vertical cross-sectional view taken through the line 4—4 of FIGURE 2; and FIGURE 5 is an enlarged fragmentary view of the bottom portion of one of the chambers and showing a sliding trap door contained therein and which constitutes the opening through which the material passes from that chamber into the chamber therebeneath.

Figure 6:
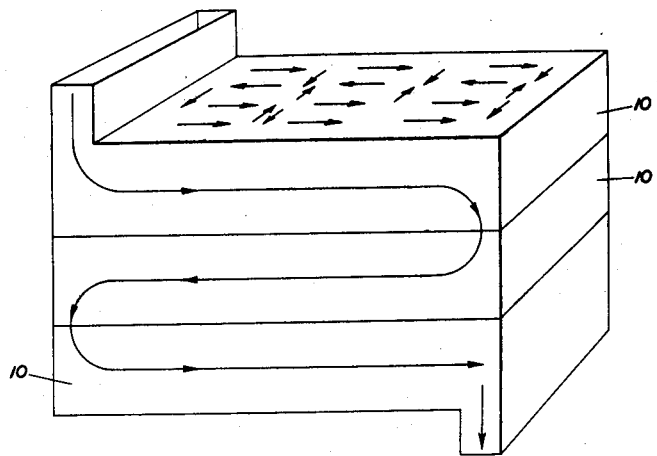
Figure 7:
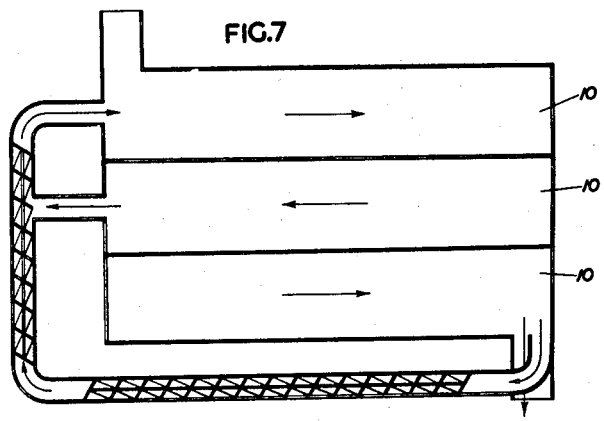

FIGURES 6 and 7 schematically indicate the circulation of the material in the overall device and FIGURE 7 shows also the inter-chamber recirculation scheme.

Figure 9:
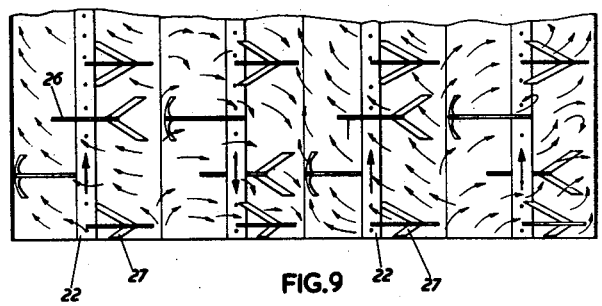
Figure 8:
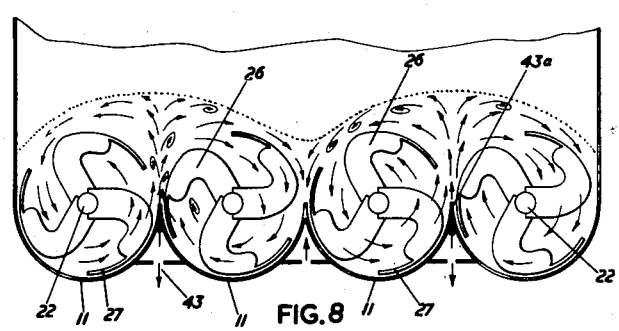

FIGURES 8 and 9 show in end and plan view the circulation effects in a single chamber.

Like characters of reference indicate corresponding parts in the different views of the drawings.

As will be apparent upon reference to FIGURE 4, the digester unit comprises four similar chambers 10 arranged in tier form and each containing four rotary blade assemblies. The bottoms of each chamber are made up of a plurality of semi-circular troughs 11 which are positioned side by side. The trough bottoms rest upon deck sheets 12 extending between the sides of the casing of the unit, the chambers being temperature insulated from one another by sheets of insulation 13 which cover the upper faces of the decks, insulation sheets 13a also covering the lower faces of the troughs 11. Such complete sealing is necessary since the temperatures of adjacent chambers may be quite different to provide for the selective multiplication or inhibition of bacteria in said chambers. The insulated merging sides of the troughs and the upper faces of the decks forming ducts for the admittance of fresh air and outlet of gas, as shall be further described.

A closable waste material loading hopper 14 is carried upon one end of the top 15 of the unit, and opens into the top chamber 10. The treated waste material or compost is discharged from the unit through a trap door opening 16 located at one end of the bottom chamber 10 of the unit.

One end of the bottom of each of the top three chambers contains a manually controlled sliding trap door 17 through which the material passes upon leaving the chamber to drop into the chamber underneath. The bottoms of the tray doors 17 carry racks 18 which mesh with pinions 19 carried upon shafts 20 having hand wheels 21 located outside of the unit.

It will thus be understood that as the waste material is dropped into one end of the top chamber 10 through the loading hopper 14 that it will be successively propelled through the chambers, dropping from one chamber to another through the discharge trap door 16 in the bottom of the lower chamber.

It will be noted that the flow of material in the chambers can be controlled both by the pitch of the blades and by the relative opening or closing of the trap doors, 16 and/or 17.

The rotary blade assemblies are of similar construction and each preferably comprise a shaft 22 mounted within bearings 23 carried upon the ends 24 and 25 of the unit casing. Blades 26 extend radially from the shafts in spaced relation to each other along the shaft's length. The blades are of substantially L-shape and the outer edges of their outer portions 26a have substantially the same curvature as the curvature of the trough-shaped bottoms and are dimensioned to be in sweeping proximity to the faces of the bottoms as they rotate. The tips of the blades 26a each carry a pair of diverging fins 27 which are arranged to rest against the faces of the troughs as the blades rotate, and thus prevent any material from clinging to the trough faces. It will be noted that the diverging fins 27 on adjacent blades 26a are wide enough so that they overlap as they sweep the trough faces, thus ensuring the cleanliness of such faces. Moreover to ensure the cross-circulation of material to be hereinafter discussed, the speeds of adjacent blade assemblies are so synchronized that any fin of one assembly is always adjacent the space between fins on the adjacent assembly so that no opposition to material transfer from one trough to the next is encountered. If desired, the fins may be replaced by scraping blades (not shown) joining longitudinally adjacent blade tips along a conveyor and adapted to scrape the sides of the cylindrical channels. By joining blades over two axially spaced blades and having different blades overlap, it will be seen that complete self cleaning may be achieved. It will, of course, be understood that the blades are formed with a slight angularity in relation to their path of rotation whereby such angularity causes the material to be gently propelled along the trough bottoms of the chambers, the direction of the blade rotation being opposed in succeeding chambers whereby the material travels in an opposite direction upon leaving one chamber and dropping into the chamber beneath. It will be noted that 2, 3, 6 or any desired number of blade assemblies may be used.

The flight portions in a single blade assembly may be varied in pitch so that the rate of travel is not constant along the appropriate trough. The result of such variations in rate of travel is to cause congestions of the material as it passes from a fast to a slow rate. Such congestion forces the material into the next trough and thus by similar pitch adjustments in all or some of the various assemblies, cross-circulation of the material throughout the chamber may be achieved.

Moreover, in order to obtain recirculation in accord with the invention, the pitch of one or more of the assemblies may be reversed so that some of the assemblies are actually carrying material from the outlet end of a chamber toward the source end thereof along a part or all of that assembly extent. Such rate of recirculation will, of course, be much less than the forward progress of the material since material must pass through the chamber in question in a continual flow. The circulation thereby provided causes progressively fermented and incubated material which has progressed toward the end of the chamber to be recirculated into comparatively greener material at the beginning of the chamber process, thus accelerating the bacteriological process at the beginning of the chamber. It will be noted that the recirculation just described and the cross-circulation described earlier may be made to co-operate with one another to provide a combined effect, and it may be that the material will not be circulated back from the end to the beginning of the chamber but merely through half its extent or through some other optimum distance.

The shafts 22 protrude from the end 25 of the unit, and each horizontal row of shafts carries similar meshing gears 28 which are driven by a pinion 29 carried upon a shaft 30. As there are here shown four chambers (any desired number may be used) and four rows of meshing gears 28, there are also four driving pinions 29 carried upon four shafts 30. The shafts 30 are journalled within bearings 31 carried upon a suitable frame 32 mounted upon the end of the unit. To drive the pinions 29, a drive shaft 33 is journalled within bearings 34 mounted upon the frame 32. The drive shaft 33 carries four chain sprocket wheels 35 which are connected to four chain sprocket wheels 36 on the shafts 30 by drive chains 37. Of the four meshing gears 28 for each chamber, two of the gears rotate in a clockwise direction and the other two in a counterclockwise direction, and it will therefore be understood that the flights 26 upon the respective shafts 22 are suitably inclined in order to propel the material in the desired direction through the chamber. It will be noted that if desired the sprocket drive may be replaced with a number of hydraulic cylinders which are adapted, when energized, to achieve a rotary movement of the shafts 22 to cause progression of the material. Since the material tends to decrease in volume during the fermentation and incubation process, it may be desired to run the conveyors on the lower decks slower than the conveyors on the upper decks so that the material on the lower decks may tend to pile up and an optimum amount of material is being simultaneously conveyed on all decks. The mechanism is so designed that this end may be achieved.

As the waste material is generally, to a certain degree, wet when it enters the unit through the loading hopper 14, the bottoms of the forward ends of the troughs 11 are perforated and water drain pans 38 positioned therebeneath. Water discharge ducts 39 extend from the pans to the outside of the unit, and in order to prevent the material from clogging the perforated bottoms of the troughs, trough shaped screens 40 are recessed within the trough bottoms.

As previously explained, the merging walls of adjacent troughs 11 and the portions of the chambers 12 therebeneath, form ducts for the admittance of fresh air to the unit and also for the withdrawal of decomposition gases. These ducts 41 for the admittance of fresh air and 42 for the withdrawal of the gases, communicate with the tops of the chambers therebeneath through orifices 43 and 44. The air inlet ducts 41 are sealed at the drive end of the unit and at the other end of the unit open into an air inlet duct 45 in which a manually controlled damper 46 is located. As the air ducts 41 are in vertical alignment, it is only necessary to provide a single air inlet duct 45. The two vertical rows of decomposition gas outlet ducts 42 discharge into a pair of exhaust gas ducts 46 at the drive end of the unit, the ducts 46 opening into the atmosphere through manually controlled dampers 52.

Upward air ducts 43a are also provided to allow air pumped through conduit 41 to move into the chamber above whereby aeration of and the addition of oxygen to the material is achieved. Moreover, and with particular reference to FIGURE 9, it will be seen that the shaft for each conveyor is a hollow tube provided with apertures connecting the inside of the tube to the material. Thus during the operation of the conveyor air may be pumped into the shaft and out through the said apertures to further aerate and to add oxygen to the material.

The unit is constructed of a plurality of vertical and horizontal frame struts 48 which are secured in assembly and sheeted with removable panels 49, inspection doors 50 being suitably located in the panels 49. The rotary blades are rotated by any suitable source of power, such as an electric motor and reduction gear, the drive shaft 33 carrying a chain sprocket wheel 51 through which the drive is transmitted. As it is necessary to maintain the unit within defined temperature limits, the sheeting panels 49 are either formed of heat insulating material or are lined with insulating material which, in combination, with the insulation 13 on the decks 12 constitutes an arrangement whereby each of the chambers 10 is surrounded by heat insulating material.

The four chambers in the unit through which the waste matter is very slowly passed are arranged to each control one of the four stages of decomposition of the organic matter, each stage coinciding with a complete movement of matter from one end of the chamber to the other.

The first stage is enzymic at relatively low temperature rising to about 100° F. During this stage starches are converted into sugar as the material gradually moves forward with the proper amount of aeration.

In the second stage, proteolytic bacteria, activated by soluble sugar produced in the first stage, attack the proteins, splitting or converting them into amino acids which combine to make ammonia, nitrate and nitrite (to accomplish this, the bacterially produced temperatures rise from about 100° F. to 110° F.). Again aeration is mechanically effected.

When the material reaches the third stage, higher temperatures prevail from 110° to 135° thus activating cellulose bacteria. These use the digestive materials, produced previously on the upper stages to attack and decompose the cellulose—first the hemi-cellulose, next the alpha-cellulose, and then the most difficult component, the lignin. The bacteria separate the joint of the lignin, and convert the material into a more or less granular, dark-coloured, humus-like material.

In the final stage, thermophilic bacteria find a highly suitable environment for further decomposition of the entire mass, while their production of high temperatures (from 135° F. to 185° F. approximately) further granulates and dries up completed humus. The material is then ready for immediate use on fields as an organic compost or humus.

At it may be desired to seed the bacteria of any of the lower chambers into one of the upper chambers, conveyors may be provided as schematically shown in FIGURE 7. Thus the bacteria desired in a second, third or fourth chamber may be increased from the second, third or fourth chamber where such bacteria are at their most dense state, to the first chamber or other chambers where it is desired to initiate the multiplication of more such bacteria. Alternatively it may not be desirable to seed the fourth chamber bacteria into the first chamber due to temperature conditions and thus the recirculation would be from the fourth to the second chamber or to whatever high chamber is desired.

Throughout the entire process, water vapour is produced, as the blades gradually turn and aerate the material moving along through the chambers. This vapour passes to a flue, in which dampers control its rate of flow. By this means moisture is evaporated until finally at the end of the process there is insufficient for the bacteria to grow rapidly. By this time it is being discharged as a finished compost at the bottom of the digester. Aerobic bacteria require oxygen and humidity at proper amounts for fast depuration. The air controls are such as to create those ideal conditions.

From the foregoing description, it will be seen that we have provided a unit wherein organic waste in being continuously passed therethrough is converted into a useable healthy compost, and have so designed the unit to provide conditions under which many strains of aerobic bacteria will work in their proper sequence. The unit has been so constructed that each stage or chamber is insulated from the other, and so controlled that the temperature, humidity and air conditions in any chamber does not affect the other stages. As the bacteria are working on the material in one stage, the material is gently moved along the stage and then lowered in the next stage, through its manually controlled sliding door 17; the trap doors being used to maintain the desired volume of material in each chamber and to prevent the counter-flow of air, gas, and temperature from one chamber to the other, the trap doors being open during operation of the digester. The action of the bacteria upon the waste matter in its passage through the unit creates the required temperatures in the chambers. If the bacterial action in the first stage is insufficient to provide the required initial temperature, such temperature may be readily obtained through warming the air passing into the top chamber, it being understood that the actual operating conditions of the unit will depend to a certain extent upon the atmospheric temperature and type of organic waste matter being handled.

We claim:

A method of converting putrefiable organic waste material into fertilizer by a bacteriological process: comprising in combination the following steps; placing a contiguous mass of such putrefiable organic waste material in a chamber; providing in said chamber conditions whereby bacteriological incubation and fermentation can take place; causing a larger portion of said mass to move gradually in one direction; simultaneously causing a smaller portion of said mass to move gradually in the opposite direction while allowing continual interchange between said portions, and, simultaneously with said motion, aerating said mass.

References Cited in the file of this patent
UNITED STATES PATENTS

| | | |
|---|---|---|
| 1,938,647 | Earp-Thomas | Dec. 12, 1933 |
| 2,043,265 | Roeder | June 9, 1936 |
| 2,734,803 | Ruskin | Feb. 14, 1956 |